United States Patent [19]

Terano et al.

[11] Patent Number: 4,829,037

[45] Date of Patent: May 9, 1989

[54] CATALYST FOR POLYMERIZATION OF OLEFINS

[75] Inventors: Minoru Terano, Chigasaki; Hirokazu Soga; Kohei Kimura, both of Kanagawa, all of Japan

[73] Assignee: Toho Titanium Co., Ltd., Tokyo, Japan

[21] Appl. No.: 150,650

[22] PCT Filed: May 6, 1987

[86] PCT No.: PCT/JP87/00278

§ 371 Date: Jan. 5, 1988

§ 102(e) Date: Jan. 5, 1988

[87] PCT Pub. No.: WO87/06945

PCT Pub. Date: Nov. 19, 1987

[30] Foreign Application Priority Data

| May 6, 1986 [JP] | Japan | 61-102088 |
| Jun. 13, 1986 [JP] | Japan | 61-136105 |
| Jun. 20, 1986 [JP] | Japan | 61-142662 |
| Jun. 24, 1986 [JP] | Japan | 61-146044 |

[51] Int. Cl.$^4$ .......................... B01J 37/00; C08F 4/00; C08F 4/60; C08F 4/64
[52] U.S. Cl. .................................. 502/112; 502/107; 502/125; 502/127
[58] Field of Search ............... 502/112, 107, 127, 125, 502/128

[56] References Cited

U.S. PATENT DOCUMENTS

| 4,485,187 | 11/1984 | Nomura et al. | 502/128 |
| 4,547,476 | 10/1985 | Terano et al. | 502/125 |
| 4,686,200 | 8/1987 | Terano et al. | 502/112 |

FOREIGN PATENT DOCUMENTS

| 54-94590 | 7/1979 | Japan . |
| 59-142206 | 8/1984 | Japan . |
| 59-145203 | 8/1984 | Japan . |

*Primary Examiner*—Patrick P. Garvin
*Assistant Examiner*—E. D. Irzinski
*Attorney, Agent, or Firm*—Oblon, Fisher, Spivak, McClelland & Maier

[57] ABSTRACT

A catalyst for the polymerization of olefins which exhibits a high catalytic activity and is capable of producing a stereoregular polymer in a high yield. The catalyst includes a catalyst component for the polymerization of olefins prepared by subjecting a solid composition obtained by a process comprising contacting dialkoxymagnesium, diester of aromatic dicarboxylic acid, aromatic hydrocarbon and titanium halide to a heat treatment in the presence or absence of a solvent; a silicon compound; and an organic aluminum compound.

27 Claims, No Drawings

CATALYST FOR POLYMERIZATION OF OLEFINS

DESCRIPTION

1. Technical Field

This invention relates to a catalyst for the polymerization of olefins which exhibits a high catalytic activity and is capable of producing a highly stereoregular olefin polymer having regular particle size distribution in a high yield.

2. Background Art

A catalyst for the polymerization of olefins formed by combining a solid titanium halide as a catalyst component with an organoaluminum compound is well known and extensively used in the art. However, in the polymerization of olefins by use of the conventional catalyst, the yield of polymer per unit weight of the catalyst component or of titanium moiety in the catalyst component (hereinafter referred to as a polymerization activity per unit weight of the catalyst component or of titanium moiety in the catalyst component) is so low that the so-called deashing process for removing catalyst residues from the produced polymer is indispensable. In the deashing process, alcohols or chelating agents are used in large amounts, so that the deashing process needs an apparatus for recovery or reprocess thereof, and consequently has many problems accompanying therewith relative to resources, energy and the like. Thus, the deashing process raises great problems to be solved urgently in the art. A number of studies and suggestions have been made for enhancing the polymerization activity per unit weight of catalyst component or of titanium moiety in the catalyst component, so that the complicated deashing process may be dispensed with.

Especially as a recent tendency, a large number of suggestions have been made such that the polymerization activity per unit weight of titanium in the catalyst component is remarkably enhanced in the polymerization of olefins with a catalyst component prepared by supporting a transition-metal compound as an active ingredient such as a titanium halide on such a carrier material as magnesium chloride.

However, the improved process employing magnesium chloride as a carrier has such drawbacks that chlorine moiety contained in the magnesium chloride predominantly used as the carrier as well as a halogen atom contained in the titanium halide gives bad influence on the resultant polymer, resulting in leaving problems to be solved such as requirements for such a high activity as to be substantially free from the adverse effect due to the chlorine moiety, or as requirements for controlling a concentration of the magnesium chloride itself at a sufficiently low level.

The present inventors proposed a process for preparing a catalyst component for the polymerization of olefins in Japanese Patent application No. 200454/1982 for an object of reducing a chlorine content in the produced polymer with high polymerization activity and high yield of stereoregular polymer, attaining the aforementioned object. Further, it is essential for a catalyst formed by combining a catalyst component using magnesium chloride as a carrier with an organoaluminum compound to carry out on an industrial scale the polymerization of olefins, especially stereoregular polymerization of propylene, 1-butene, and the like in the presence of an electron donor compound such as aromatic carboxylic acid esters in the polymerization system. However, the aforementioned aromatic carboxylic acid ester imparts a peculiar estereal odor to the produced polymer, raising a serious problem of deodorizing therefrom in the art.

It was substantially impossible for the so-called highly active supported catalyst formed by use of a catalyst component employing the aforementioned magnesium chloride as a carrier to be of practical use, because use of the supported catalyst results in abrupt deactivation thereof in spite of high activity thereof in the beginning of polymerization, and results in raising problems in process operations, particularly in the case where a prolonged polymerization time is required as in block copolymerization and the like. In order to solve the aforementioned problems, Japanese Patent laid-open publication No. 94590/1979 discloses a catalyst for the polymerization of olefins which comprises a catalyst component prepared by use of magnesium dihalide as one of the starting materials, an organoaluminum compound, an aromatic carboxylic acid ester, and a compound having a M—O—R group. However, the catalyst disclosed as above fails to solve the problem of deodorizing from the produced polymer in that organic carboxylic acid esters are used on polymerization, and requires complicated procedures for the preparation thereof as shown in the Examples with practically insufficient catalyst performance and polymerization activity with time.

Furthermore, it is required in an apparatus for the polymerization of olefins on an industrial scale to supply a catalyst in a polymerization tank which is kept at a high temperature. In this instance, the conventional supported catalysts exhibit significant decrease in catalytic activity, stereospecific performance, bulk density and the like. This was a big problem, particularly, in a so-called continuous slurry polymerization process using an organic solvent, and the improvement thereof is strongly demanded in the art.

The present invention has been made after extensive research and experimentation for overcoming the foregoing disadvantages of the prior art.

DISCLOSURE OF THE INVENTION

The present invention provides a catalyst for the polymerizatin of olefins which comprises:

(I) a catalyst component prepared by subjecting a solid composition obtained by a process comprising contacting (a) dialkoxymagnesium, (b) diester of aromatic dicarboxylic acid, (c) aromatic hydrocarbon and (d) titanium halide to a heat treatment in the presence or absence of a solvent;

(II) a silicon compound represented by a general formula $SiR_m(OR')_{4-m}$ (hereinafter referred to as "silicon compound"), wherein R is hydrogen, alkyl group or aryl group, R' is alkyl group or aryl group, and m is represented as $0 \leq m \leq 4$; and (III) an organoaluminum compound. Polymerization of olefins by use of the catalyst component of the present invention shows such a high catalytic activity that the amount of the catalyst residues in the produced polymer is reduced to a very low level, and chlorine content in the produced polymer is reduced to a trace amount, resulting in that influence of chlorine on the produced polymer is reduced to such an extent that the deashing process may be completely dispensed with.

Since chlorine contained in the produced polymer causes corrosion of devices employed in such steps as pelletizing and molding, and further causes deterioration, yellowing, etc. of the produced polymer itself, reduction of chlorine content in the produced polymer as above has an extremely important meaning in the art.

Further features of the present invention reside in that the problem of the estereal odor in the produced polymer has been solved without using aromatic carboxylic acid esters on polymerization, and that such a substantial defect of the so-called highly active supported catalyst as mentioned above that catalyst activity per unit time is greatly reduced as polymerization proceeds has been overcome to provide a catalyst practically applicable to copolymerization of olefins as well as homopolymerization thereof.

It is of a common practice in the preparation of olefinpolymer on an industial scale that polymerization is carried out in the presence of hydrogen from the standpoints of controlling the melt index of polymer, etc., and the catalyst formed from the catalyst component prepared by use of magnesium chloride as a carrier in the presence of hydrogen has such a disadvantage that both catalytic activity and stereoregularity of the polymer are greatly reduced. However, polymerization of olefins in the presence of hydrogen using the catalyst of the present invention provides such an effect that little or no decrease in catalytic activity and in stereoregularity of the polymer is observed in spite of very high melt index of the polymer, providing extremely great advantages in the art.

An additional effect of the present invention is in that the catalyst of the present invention has an excellent property in catalytic activity, stereospecific performance and bulk density of the produced polymer which are significantly decreased when the conventional supported catalyst is supplied into a polymerization tank maintained at a high temperature in a polymerization apparatus on an industrial scale, particularly in ths so-called continuous slurry polymerization process using an organic solvent, for which. improvements are strongly demanded in the art. The decrease in the bulk density of the produced polymer causes production capacities of the polymerization plant to be seriously deteriorated and invites shutdown of the plant in the worst case. The catalyst of the present invention satisfactorily solves these problems.

BEST MODE FOR CARRYING OUT THE INVENTION

Examples of the dialkoxymagnesium used in the present invention include diethoxymagnesium, dibutoxymagnesium, diphenoxymagnesium, dipropoxymagnesium, di-secbutoxymagnesium, di-tert-butoxymagnesium, diisopropoxymagnesium and the like, preferably including diethoxymagnesium and dipropoxymagnesium.

Examples of diester of aromatic dicarboxylic acid used in the preesnt invention preferably include diester of phthalic acid, more specifically, dimethylphthalate, diethylphthalate, dipropylphthalate, diisopropylphthalate, dibutylphthalate, diisobutylphthalate, diamylphthalate, diisoamylphthalate, ethylbutylphthalate, ethylisobutylphthalate, ethylpropylphthalate and the like.

Examples of aromatic hydrocarbon used in the present invention include toluene, o-xylene, m-xylene, p-xylene, benzene, ethylbenzene, propylbenzene, trimethylbenzene and the like which are liquid at normal temperature.

Examples of titanium halide used in the present invention include $TiCl_4$, $TiBr_4$, $TiI_4$ and the like, preferably including $TiCl_4$.

Examples of solvent used in the present invention include aliphatic hydrocarbons, aromatic hydrocarbons and hydrocarbon halides which are liquid at normal temperatures. For example, the aromatic hydrocarbons include those having 5 to 15 carbon atoms; the aromatic hydrocarbons include those having 6 to 10 carbon atoms, such as, for example, toluene, o-xylene, m-xylene, p-xylene, benzene, ethylbenzene, propylbenzene, trimethylbenzene and the like; and the hydrocarbon halides include aliphatic hydrocarbon halides havingf 5 to 15 carbon atoms and aromatic hydrocarbon halides having 6 to 10 carbon atoms.

The silicon compound used in the present invention includes phenylalkoxysilanes, alkylalkoxysilanes and the like. Examples of phenylalkoxysilane include phenyltrimethoxysilane, phenyltriethoxysilane, phenyltripropoxysilane, phenyltriisopropoxysilane, diphenyldimethoxysilane, diphenyldiethoxysilane and the like. Examples of alkylalkoxysilane include tetramethoxysilane, tetraethoxysilane, trimethoxyethysilane, trimethoxymethysilane, triethoxymethylsilane, ethyltriethoxysilane, ethyltriisopropoxysilane and the like.

The amount to be used of ingredients, the conditions of contact of the ingredients, and the like for the preparation of the solid composition in the present invention are not specifically limited unless they have adverse effects on the performance of the catalyst component formed therefrom, but diester of aromatic dicarboxylic acid is used normally in an amount of from 0.01 to 2 g, preferably from 0.1 to 1 g based on 1 g of dialkoxymagnesium. The titanium halide is used normally in an amount more than 0.1 g, preferably more than 1 g based on 1 g of dialkoxymagnesium. The aromatic hydrocarbon may be used in an arbitrary amount, preferably in such an amount as to form a suspension.

Each of the ingredients used for the formation of the catalyst component of the present invention is brought into contact at a temperature ranging from generally 0° C. to a boiling point of the titanium halide used for less than 100 hours, preferably for less than 10 hours.

The contacting order and method of the starting materials used for formatin of the catalyst component are not specifically limited, and any suitable manner may be used.

The solid composition obtained after having been brought into contact may be further brought into contact one or more times with the titanium halide, and also may be washed with an organic solvent such as n-heptane or the like.

The solid composition thus obtained is subjected to a heat treatment. The heat trèatment is carried out in the presence of an solvent in an amount of more than 0.1 g based on 1 g of the composition or in the absence of the solvent normally at a temperature of above 30° C. for at least 1 minute preferably at least 5 minutes. The heat treatment may be conducted under a normal pressure or reduced pressure.

The catalyst component thus obtained is combined with the silicon compound and an organoaluminum compound to form a catalyst for the polymerization of olefins. The organoaluminum compound is used in a molar ratio of from 1 to 1000 per atom of titanium in the catalyst component, and the silicon compound is used in a molar ratio of less than 1 preferably from 0.005 to 0.5 per mole of the organoaluminum compound.

The polymerization of olefins may be performed in the presence of, or in the absence of an organic solvent, and olefin monomers may be used in the gaseous or liquid state. The polymerization temperature is below 200° C., preferably below 100° C., and the polymerization pressure is below 100 kg/cm² gauge preferably below 50 kg/cm² gauge.

Examples of olefins homopolymerized or copolymerized by use of the catalyst prepared according to the method of the present invention include ethylene, propylene, 1-butene and the like.

EXAMPLES

The following examples and comparative example illustrate the present invention more in detail.

EXAMPLE 1

(Preparation of Catalyst Component)

To a 200 ml round flask fitted with a stirrer and thoroughly purged with nitrogen are charged 10 g of diethoxy magnesium and 80 ml of toluene to form a suspension. Then 20 ml of TiCl₄ is injected into the suspension, which is elevated at a temperature of 90° C., and 2.7 ml of dibutylphthalate is further injected thereto followed by heating up to 115° C. for reacting with agitation at that temperture for 2 hours. After the completion of the reaction, a reaction product is washed twice with 100 ml of toluene at 90° C., and 80 ml of fresh toluene and 20 ml of TiCl₄ are added thereto for reacting with agitation at 115° C. for two hours. After the completion of the reaction, the reaction product is washed 10 times with 200 ml of n-heptane at 40° C. and is dried under a reduced pressure to obtain a solid composition. The titanium content in the solid composition is measured to be 2.61% by weight. Then, 3 g of the solid composition is charged in a 200 ml round flask fitted with a stirrer and thoroughly purged with nitrogen, and is subjected to a heat treatment at 100° C. for 1 hour adding 30 ml of n-heptane thereby to obtain a catalyst component.

(Polymerization)

To a 2.0 l autoclave fitted with a stirrer, the air in which is thoroughly replaced with nitrogen, 700 ml of n-heptane, 301 mg of triethylaluminum and, 64 mg of phenyltriethoxysilane are charged in an atmosphere of nitrogen. Thereafter, 120 ml of hydrogen gas and 10.0 mg of the catalyst component obtained as above are charged thereinto and the resultant mixture is heated to 70° C. and subjected to polymerization under a pressure of 6 kg/cm².G for 4 hours introducing thereinto propylene gas. After the completion of the polymerization reaction, solid polymer thus obtained is collected by filtration and dried by heating at 80° C. under reduced pressure. On the other hand, the filtrate is thickened to obtain polymer soluble in a solvent used in polymerization. The amount of the polymer soluble in the solvent used in polymerization is represented by (A) and the amount of the solid polymer obtained as above is represented by (B). The solid polymer is subjected to extraction with boiling n-heptane for 6 hours to obtain polymer insoluble in boiling n-heptane, the amount of which is represented by (C). The polymerization activity (D) per unit weight of the catalyst component is represented by the formula $$(D) = \frac{[(A) + (B)] (g)}{\text{amount of catalyst component (g)}}$$

and the yield (E) of crystalline polymer is represented by the formula $$(E) + \frac{(C)}{(B)} \times 100\%$$

Further, the overall yield (F) of crystalline polymer is represented by the formula $$(F) + \frac{(C)}{(A) + (B)} \times 100\%$$

The chlorine content, melt index and bulk density of the produced polymer are represented by (G), (H) and (I), respectively. Results thus obtained are shown in Table 1.

EXAMPLE 2

The procedures of Example 1 are repeated except that polymerization reaction is effected for 6 hours. Results thus obtained are shown in Table 1.

EXAMPLE 3

The procedures of Example 1 are repeated except that a heat treatment is effected at 80° C. for 2 hours instead of at 100° C. for 1 hour. In the polymerization, the procedures of Example 1 are repeated. Results thus obtained are shown in Table 1.

EXAMPLE 4

The procedures of Example 1 are repeated except that 30 ml of o-dichlorobenzene is added to a solid composition which is subjected to a heat treatment at 90° C. for 2 hours to prepare a catalyst component. Results thus obtained are shown in Table 1.

EXAMPLE 5

The procedures of Example 1 are repeated except that the polymerization reaction is effected for 6 hours using the catalyst components obtained in Example 1. Results thus obtained are shonw in Table 1.

EXAMPLE 6

The procedures of Example 1 are repeated except that a heat treatment is effected at 80° C. for 3 hours instead of at 90° C. for 2 hours as in Example 4 to prepare a catalyst component. Results thus obtained are shown in Table 1.

EXAMPLE 7

The procedures of Example 1 are repeated except that 30 ml of toluene is added to a solid composition which is subjected to a heat treatment at 100° C. for 1 hour to prepare a catalyst component. Results thus obtained are shown in Table 1.

EXAMPLE 8

The procedures of Example 1 are repeated except that the polymerization reaction is effected for 6 hours using the catalyst component obtained in Example 1. Results thus obtained are shown in Table 1.

EXAMPLE 9

The procedures of Example 1 are repeated except that a heat treatment is effected at 80° C. for 2 hours instead of at 100° C. for 1 hour as in Example 7 to prepare a catalyst component. Results thus obtained are shown in Table 1.

EXAMPLE 10

The procedures of Example 1 are repeated except that the solid composition is subjected to a heat treatment at 100° C. for 1 hour in the absence of a solvent to prepare a catalyst component. Results thus obtained are shown in Table 1.

EXAMPLE 11

The procedures of Example 1 are repeated except that the polymerization reaction is effected for 6 hours using the catalyst component obtained in Example 10. Results thus obtained are shown in Table 1.

EXAMPLE 12

The procedures of Example 1 are repeated except that a heat treatment is effected at 80° C. for 3 hours instead of at 100° C. for 1 hour as in Example 10 to prepare a catalyst component. Results thus obtained are shown in Table 1.

COMPARATIVE EXAMPLE

The solid composition obtained in Example 1 is used as a catalyst component without being subjected to a heat treatment. In polymerization, the procedures of Example 1 are repeated. Results thus obtained are shown in Table 1.

Industrial Applicability

As explained hereinabove, the catalyst of the present invention is useful as a catalyst for the polymerization of olefins, such as, ethylene, propylene, 1-butene and the like. In particular, the catalyst of the present invention exhibits a high catalytic activity and is capable of producing stereoregular polymers in a high yield, which is suitable for use for producing olefin polymers on an industrial scale.

TABLE 1

| | \multicolumn{12}{c|}{Examples} | Comparative Example |
|---|---|---|---|---|---|---|---|---|---|---|---|---|---|
| | 1 | 2 | 3 | 4 | 5 | 6 | 7 | 8 | 9 | 10 | 11 | 12 | |
| Amount of Polymer Soluble in the Solvent used in Polymerization (A) g | 2.8 | 3.9 | 3.0 | 2.7 | 3.5 | 2.6 | 2.4 | 3.4 | 2.8 | 2.4 | 3.2 | 2.6 | 3.3 |
| Amount of Solid Polymer (B) g | 235.2 | 324.6 | 238.0 | 223.1 | 310.1 | 226.2 | 230.3 | 315.5 | 228.2 | 212.2 | 290.7 | 220.1 | 232.8 |
| Amount of Polymer Insoluble in Boiling n-Heptane (C) g | 232.8 | 321.3 | 235.2 | 220.6 | 306.6 | 223.7 | 227.9 | 312.6 | 225.7 | 209.7 | 287.5 | 217.3 | 228.8 |
| Polymerization Activity per Unit Weight of Catalyst Component (D) | 23800 | 32850 | 24100 | 22580 | 31360 | 22880 | 23270 | 31890 | 23100 | 21460 | 29390 | 22270 | 23610 |
| Yield of Crystalline Polymer (E) % | 99.0 | 99.0 | 98.8 | 98.9 | 98.9 | 98.9 | 99.0 | 99.1 | 98.9 | 98.8 | 98.9 | 98.7 | 98.3 |
| Overall Yield of Crystallin Polymer (F) % | 97.8 | 98.0 | 97.6 | 97.7 | 97.8 | 97.8 | 97.9 | 98.0 | 97.7 | 97.7 | 97.8 | 97.6 | 96.9 |
| Chlorine Content in Produced Polymer (G) ppm | 25 | 18 | 25 | 26 | 19 | 26 | 26 | 19 | 26 | 28 | 20 | 27 | 25 |
| Melt Index of the Produced Polymer (H) | 11.6 | 13.2 | 12.2 | 11.8 | 12.2 | 10.9 | 9.7 | 11.7 | 10.9 | 10.1 | 11.6 | 11.8 | 23.1 |
| Bulk Density of Produced Polymer (I) | 0.41 | 0.42 | 0.40 | 0.41 | 0.42 | 0.40 | 0.40 | 0.41 | 0.40 | 0.42 | 0.42 | 0.41 | 0.32 |

We claim:

1. A catalyst for the polymerization of olefins comprising:
   (I) a catalyst component prepared by subjecting a solid composition obtained by a process comprising contacting (A) dialkoxymagnesium, (b) diester of aromatic dicarboxylic acid, (c) aromatic hydrocarbon and (d) titanium halide to a heat treatment in the presence or absence of a solvent;
   (II) a silicon compound represented by a general formula $SiR_m(OR')_{4-m}$, wherein R is hydrogen, alkyl group or aryl group, R' is alkyl group or aryl group, and m is represented as $0 \leq m \leq 4$; and
   (III) an organoaluminum compound.

2. A catalyst for the polymerization of olefins as defined in claim 1, wherein the dialkoxymagnesium is selected from the group consisting of diethoxymagnesium, dibutoxymagnesium, diphenoxymagnesium, dipropoxymagnesium, di-sec-butoxymagnesium, di-tert-butoxymagnesium and diisopropoxymagnesium.

3. A catalyst for the polymerization of olefins are defined in claim 1, wherein the diester of aromatic dicarboxylic acid is diester of phthalic acid.

4. A catalyst for the polymerization of olefins as defined in claim 3, wherein the diester of phthalic acid is selected from the group consisting of diemthylphthalate, diethylphthalate, dipropylphthalte, diisopropylphthalate, dibutylphthalate, diisobutylphthalate, diamylphthalate, diisoamylphthalate, ethylisobutylphthalate and ethylpropylphthalate.

5. A catalyst for the polymerization of olefins as defined in claim 1, wherein the aromatic hydrocarbon is liquid at normal temperatures.

6. A catalyst for the polymerization of olefins as defined in claim 5, wherein the aromatic hydrocarbon is selected from the group consisting of toluene, o-xylene, m-xylene, p-xylene, benzene, ethylbenzene, propylbenzene and trimethylbenzene.

7. A catalyst for the polymerization of olefins as defined in claim 1, wherein the titanium halide is selected from the group consisting of $TiCl_4$, $TiBr_4$ and $TiI_4$.

8. A catalyst for the polymerization of olefins as defined in claim 1, wherein the solvent is aliphatic hydrocarbon which is liquid at normal temperatures.

9. A catalyst for the polymerization of olefins as defined in claim 8, wherein the aliphatic hydrocarbon has 5 to 15 carbon atoms.

10. A catalyst for the polymerization of olefins as defined in claim 1, wherein the solvent is aromatic hydrocarbon which is liquid at normal temperatures.

11. A catalyst for the polymerization of olefins as defined in claim 10, wherein the aromatic hydrocarbon has 6 to 10 carbon atoms.

12. A catalyst for the polymerization of olefins as defined in claim 11, wherein the aromatic hydrocarbon is selected from the group consisting of toluene, o-xylene, m-xylene, p-xylene, benzene, ethylbenzene, propylbenzene and trimethylbenzene.

13. A catalyst for the polymerization of olefins as defined in claim 1, wherein the solvent is halogenated hydrocarbon which is liquid at normal temperatures.

14. A catalyst for the polymerization of olefins as defined in claim 13, wherein the halogenated hydrocarbon is halogenated aliphatic hydrocarbon having 5 to 15 carbon atoms.

15. A catalyst for the polymerization of olefins as defined in claim 13, wherein the halogenated hydrocarbon is halogenated aromatic hydrocarbon having 6 to 10 carbon atoms.

16. A catalyst for the polymerization of olefins as defined in claim 1, wherein the catalyst component is prepared by contacting the dialkoxymagnesium, diester of aromatic dicarboxylic acid, aromatic hydrocarbon and titanium halide to obtain a solid composition, and then subjecting the solid composition to the heat treatment.

17. A catalyst for the polymerization of olefins as defined in claim 1, wherein the silicon compound is phenylalkoxysilane.

18. A catalyst for the polymerization of olefins as defined in claim 17, wherein the phenylalkoxysilane is selected from the group consisting of phenyltrimethoxysilane, phenyltriethoxysilane, phenyltripropoxysilane, phenyltriisopropoxysilane, diphenyldimethoxysilane and diphenyldiethoxysilane.

19. A catalyst for the polymerization of olefins as defined in claim 1, wherein the silicon compound is alkylalkoxysilane.

20. A catalyst for the polymerization of olefins as defined in claim 19, wherein the alkylalkoxysilane is selected from the group consisting of tetramethoxysilane, tetraethoxysilane, trimethoxylethylsilane, trimethoxymethylsilane, triethoxymethylsilane, ethyltriethoxysilane and ethyltriisopropoxysilane.

21. A catalyst for the polymerization of olefins as defined in claim 1, wherein the diester of aromatic dicarboxylic acid and titanium halide are used in amounts of 0.01 to 2 g and 0.1 g or more based on 1 g dialkoxymagnesium of 1 g, respectively.

22. A catalyst for the polymerization of olefins as defined in claim 1, wherein the dialkoxymagnesium, diester of aromatic dicarboxylic acid and titanium halide are brought into contact at a temperature of ranging from 0° C. to a boiling point of the titanium halide for less than 100 hours.

23. A catalyst for the polymerization of olefins as defined in claim 1, wherein the solid composition obtained by contacting the dialkoxymagnesium, diester of aromatic dicarboxylic acid and aromatic hydrocarbon is further brought into contact one or more times with the titanium halide.

24. A catalyst for the polymerization of olefins as defined in claim 8 or 9, wherein the heat treatment is effected at a temperature of above 30° C. for at least 1 minute in the presence of aliphatic hydrocarbon in an amount of more than 0.1 g based on 1 g of the solid composition obtained by contacting the dialkoxymagnesium, diester of aromatic dicarboxylic acid, aromatic hydrocarbon and titanium halide.

25. A catalyst for the polymerization of olefins as defined in any one of claims 10 to 12, wherein the heat treatment is effected at atemperature of above 30° C. for at least 1 minute in the presence of aromatic hydrocarbon in an amount of more than 0.1 g based on 1 g of the solid composition obtained by contacting the dialkoxymagnesium, diester of aromatic dicarboxylic acid, aromatic hydrocarbon and titanium halide.

26. A catalyst for the polymerization of olefins as defined in any one of claims 13 to 15, wherein the heat treatment is effected at temperature of above 30° C. for at least 1 minute in the presence of hydrocarbon halide in an amount of more than 0.1 g based on 1 g of the solid composition obtained by contacting the dialkoxymagnesium, diester of aromatic dicarboxylic acid, aromatic hydrocarbon and titanium halide.

27. A catalyst for the polymerization of olefins as defined in claim 16, wherein the solid composition obtained by contacting the dialkoxymagnesium, diester of aromatic dicarboxylic acid, aromatic hydrocarbon and titanium halide is dried and then subjected to the heat treatment at 30° C. for at least 1 minute.

* * * * *